United States Patent [19]

Maina

[11] 4,185,725

[45] Jan. 29, 1980

[54] SYNCHRONIZER ARRANGEMENTS FOR STEPPED-RATIO TRANSMISSIONS

[75] Inventor: Mario J. Maina, Luton, England

[73] Assignee: General Motors Corporation, Detroit, Mich.

[21] Appl. No.: 905,744

[22] Filed: May 15, 1978

[30] Foreign Application Priority Data

May 17, 1977 [GB] United Kingdom ............. 20670/77

[51] Int. Cl.² ........................................... F16D 23/06
[52] U.S. Cl. .................................................. 192/53 F
[58] Field of Search .................. 192/53 F, 54; 74/339

[56] References Cited

U.S. PATENT DOCUMENTS

| | | | |
|---|---|---|---|
| 3,175,412 | 3/1965 | Peras | 192/53 F X |
| 3,347,347 | 10/1967 | Hetmann | 192/53 F |
| 3,856,121 | 12/1974 | Usui et al. | 192/53 F |

FOREIGN PATENT DOCUMENTS

| | | |
|---|---|---|
| 494411 | 10/1938 | United Kingdom . |
| 1259420 | 1/1972 | United Kingdom . |
| 1473844 | 5/1977 | United Kingdom . |

*Primary Examiner*—Rodney H. Bonck

*Attorney, Agent, or Firm*—A. M. Heiter

[57] ABSTRACT

A synchronizer arrangement for bringing first and second rotary members of a stepped-ratio transmission, (for example a gearbox mainshaft and a constant-mesh gear that is rotatably mounted on the mainshaft) into rotary synchronism. A primary synchronizer element (for example a synchro ring) is drivable by the first rotary member and is axially movable into frictional engagement with an intermediate element (for example a primary synchronizing cone) to thereby develop at the intermediate element, by the co-operation of respective friction surfaces, a synchronizing drag torque component which by the action of a pair of co-operating ramp surfaces—possibly with interposed friction-reducing rollers—produces axial movement of the intermediate element to provide a clamping action at a pair of opposed radially extending annular friction-clutch surfaces of a secondary synchronizer element that is of higher torque-inducing capacity than the primary element, to provide an additional synchronizing drag torque component which performs the major contribution in bringing the first and second rotary members of the stepped-ratio transmission into rotary synchronism.

8 Claims, 8 Drawing Figures

SECONDARY ELEMENT
PRIMARY ELEMENT

SYNCHRONIZER ARRANGEMENTS FOR STEPPED-RATIO TRANSMISSIONS

This invention relates to synchronizer arrangements for stepped-ratio transmissions, primarily for use in motor vehicles.

The conventional type of synchromesh mechanism, as currently in wide use on passenger car and light truck gearboxes, is not adequate for heavy-duty applications such as heavy truck transmissions, where the large inertias of the rotating parts impose the requirements of developing high synchronizing torques, and yet it is desirable to maintain relatively light shift loads at the gear change lever.

One way of meeting these somewhat conflicting requirements for heavy-duty gearboxes such as are used on commercial vehicles is to make use of a self-energizing effect, rather as in a sprag brake.

A specific proposal on these lines is contained in the specification of our co-pending application for United Kingdom Letters Patent No. 29,504/73 (Ser. No. 1,473,844), in which there is described and claimed a synchromesh mechanism in which torque-transmitting frictional interengagement of a first set of co-operating friction surfaces of a rotary drive member (for example, a gearwheel) and of a synchronizer element (for example, a synchro ring) is arranged to produce a synchronizing drag torque component which contributes to bringing the drive member into rotary synchronism with another rotary member (which may be a rotary shaft that is connected to a coupling member which drives the synchronizer element), with the torque reaction of the said synchronizing drag torque being transmitted by way of the synchronizer element to become effectively applied at a second set of co-operating friction surfaces, constituted by radially extending annular surfaces of a friction-clutch element (for example, a friction-clutch plate) and of the rotary drive member respectively, of higher torque-carrying capacity than the first set to provide an additional synchronizing drag torque component which performs the major contribution in bringing the drive member and the other rotary member into rotary synchronism.

A synchronizer arrangement in accordance with the present invention is similarly based on the principle of utilising a primary synchronizer element to activate a clutch plate type of secondary synchronizer element which is of higher torque-inducing capacity and operates to provide the major proportion of synchronizing torque to bring two members of a gear train configuration into synchronous rotation, but is constructed and operates differently in certain important respects contributing to a potentially high-capacity synchronizing action.

From one aspect of the present invention, in a synchronizer arrangement for bringing first and second rotary members of a stepped-ratio transmission into rotary synchronism, a primary synchronizer element is drivable by the first rotary member and is axially movable into frictional engagement with an intermediate element to thereby develop at the intermediate element, by the co-operation of respective friction surfaces, a synchronizing drag torque component which by the action of a pair of co-operating ramp surfaces produces axial movement of the intermediate element to provide a clamping action at a pair of opposed radially extending annular friction-clutch surfaces of a secondary synchronizer element that is of higher torque-inducing capacity than the primary element, to provide an additional synchronizing drag torque component which performs the major contribution in bringing the first and second rotary members of the stepped-ratio transmission into rotary synchronism.

From another aspect of the present invention, a synchronizer arrangement for bringing first and second rotary members of a stepped-ratio transmission into rotary synchronism comprises a primary synchronizer element drivable by the first rotary member and provided with a friction surface, an intermediate element provided with a friction surface, means for effecting axial movement of the primary synchronizer element into frictional engagement with the intermediate element and thereby produce a synchronizing drag torque component at the intermediate element by co-operation of the said friction surfaces, a pair of co-operating ramp surfaces arranged to rotate with the intermediate element and the second rotary member respectively, means providing axial reaction for the ramp surface which rotates with the second rotary member, and a secondary synchronizer element that is connected to rotate with the second rotary member and is of higher torque-inducing capacity than the primary element, the secondary synchronizer element having a pair of opposed radially extending annular friction-clutch surfaces, and the synchronizing drag torque component at the intermediate element being effective, by the action of the pair of co-operating ramp surfaces, to produce axial movement of the intermediate element providing a clamping action at the pair of opposed radially extending annular friction-clutch surfaces of the secondary synchronizer element, to provide an additional synchronizing drag torque component which performs the major contribution in bringing the first and second rotary members of the stepped-ratio transmission into rotary synchronism.

A synchronizer arrangement in accordance with the present invention has the potential of permitting a particularly compact and robust construction, with high-capacity synchronizing action.

Such surfaces of the synchronizer arrangement as are intensely loaded may be of hardened steel, for achieving a high torque capacity.

Thus, if rollers are interposed between the co-operating ramp surfaces, the use of hardened steel for the ramp surfaces is desirable to avoid brinelling of these surfaces by the rollers. Alternatively, instead of rollers, a PTFE (polytetrafluorethylene) interlayer, in the form of a film or PTFE-coated spacer, could be used between the co-operating ramp surfaces.

The prior proposal was specifically described in the context of a baulk pin type of synchronizer, and the present synchronizer arrangement is likewise applicable to the baulk pin type of synchronizer. However, the present arrangement lends itself particularly well to use in the so-called Warner type of synchronizer, utilising a sliding clutch sleeve and external-engaging teeth (external dogs), which is advantageous when there are very high torques to be accommodated, because it permits a particularly robust construction, whereas the baulk pin type of synchronizer tends not to be sufficiently strong for use with these very high torques.

The Warner type of synchronizer will normally include a ring of bevelled teeth to provide a baulking action, although a variant is possible (for example for a first-gear ratio) in which such baulking teeth are omitted.

For high torque capacity the friction surfaces of the present arrangement should be disposed at a large radius relative to the main axis of rotation (mainshaft axis), and this can be achieved without difficulty in the context of the Warner type of synchronizer, in addition to which the co-operating ramp surfaces may be disposed at a lesser radius, as at a location radially inwardly of the intermediate element, to provide a particularly compact and relatively simple arrangement.

Depending on the design, the present arrangement has the potential of providing a torque capacity in excess of three times that of a conventional cone type of synchronizer of similar dimensions.

The present arrangement also has the potential of providing relatively rapid synchronization at high torque loadings, without the need for unacceptably high peak loads at the gear lever, so offering the possibility of achieving something like passenger-car shift quality in a truck. Thus with the present arrangement a design should be feasible permitting first-speed synchronization within one second, for a 40–50 lbs. (dynamic) peak load at the gear lever knob.

The appended claims define the scope of the invention claimed. The invention and how it can be performed are hereinafter particularly described with reference to the accompanying drawings, in which:

Figure 1:
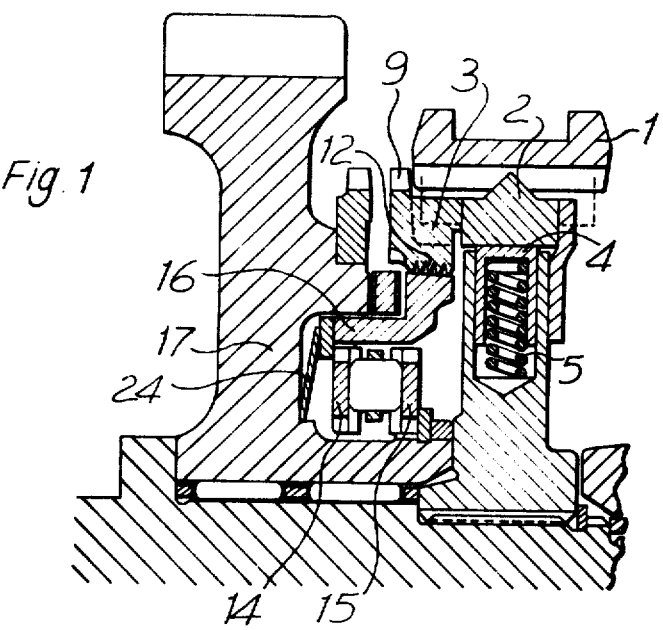
FIG. 1 is a fragmentary longitudinal section illustrating one embodiment of a synchronizer arrangement in accordance with the present invention, utilising a detent-key type of sliding-sleeve construction.
Figure 5:
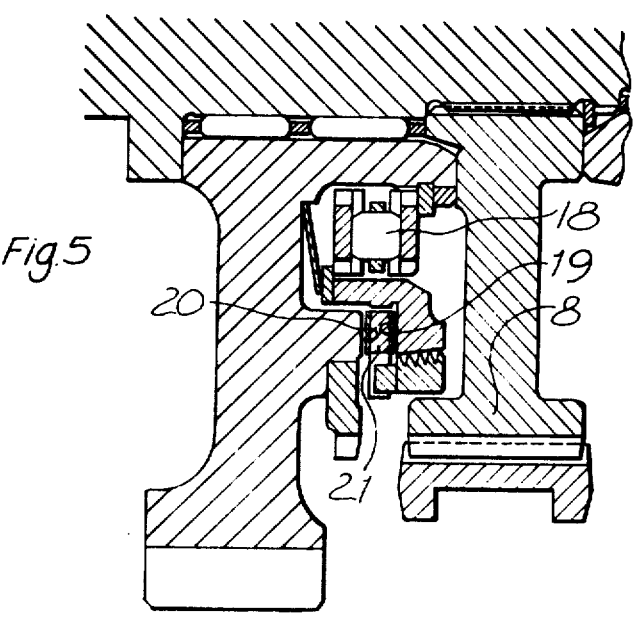
FIG. 5 is a further fragmentary longitudinal section of the synchronizer arrangement, illustrating the radial location of a clutch plate (constituting a secondary synchronizing element) to the primary synchronizing element.

As is shown in FIGS. 1 and 5 of the drawings, a sliding-sleeve clutch member 1 which rotates with a gearbox mainshaft and is provided with internal clutch teeth is axially movable to displace detent keys 2 into abutment with a primary synchronizing element 3 constituted by a synchro ring, to apply axial loading to the primary synchronizing element. Further axial movement of the clutch member will cause the detent keys to depress a plunger 4 against the action of a detent spring 5.

Figure 2:
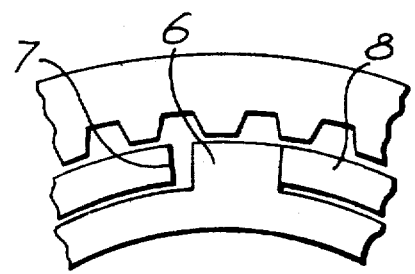
FIG. 2 is a fragmentary end view showing provision for radial location of a primary synchronising element of the arrangement shown in FIG. 1.
Figure 3:
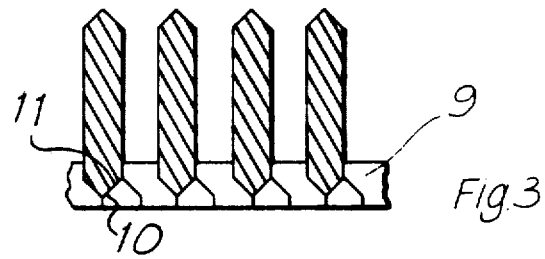
FIG. 3 is a fragmentary developed view showing the abutment of baulk chamfers in the FIG. 1 arrangement.

The resulting energising force on the primary synchronising element will cause the element to move circumferentially into a position determined by radial lugs 6, shown in FIG. 2, on the primary synchronizing element, these lugs interacting in respective slots 7 of a driving hub member 8 that is splined to the gearbox mainshaft. Thereby, a ring of baulking teeth 9 on the primary synchronizing element is displaced circumferentially so that these baulking teeth impede further axial movement of the clutch member, by interaction of baulk chamfers 10 and 11 of the baulking teeth and the internal clutch teeth respectively. Axial load from the clutch member is transferred by way of the baulk chamfers to a cone surface 12 of the primary synchronizing element, and is sustained until synchronization is nearing completion and the opposing axial force at the baulk chamfers falls (with the reduction in synchronizing drag torque) to a level permitting release of the baulk action and further shift movement into positive-clutch engagement with external-engagement teeth on a constant-mesh gear 17 that is rotatably mounted by way of needle bearings on the gearbox mainshaft.

Figure 4:
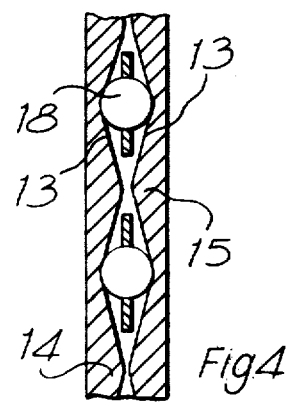
FIG. 4 is a fragmentary circumferential section illustrating ramp surfaces and interposed rollers in the FIG. 1 arrangement.

The drag torque at the cone surface reacts at a pair of opposed sets of ramp surfaces 13 (FIG. 4) between cam plate members 14 and 15 which are fixed respectively to an intermediate element 16, constituting a primary synchronizing cone, and the gear 17. In order to reduce friction, a roller 18 is interposed between each set of ramp surfaces. The ramp surfaces are made of hardened steel.

The cam plate member 14 which is fixed to the intermediate element can be considered to be an "active" ramp plate, and the cam plate member 15 can be considered to be an "inactive" ramp plate. The "inactive" ramp plate 15 takes its axial reaction from the gear 17 in this embodiment, although an alternative construction is possible in which reaction is taken from a hub member.

The action of transmitting torque through the ramp surfaces results in an axial force tending to close a clutch surface 19 (FIG. 5), which is part of the intermediate element 16, towards a clutch surface 20 of the gear 17, such that the intermediate element moves axially in the manner of a friction-clutch actuating plate, to provide an effective clamping action on a clutch plate 21, which is formed with a pair of opposed radially extending annular friction-clutch surfaces.

Figure 6:
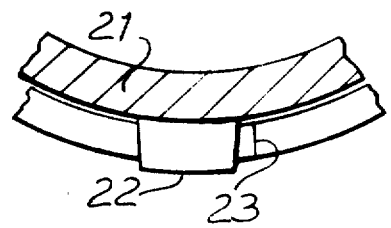
FIG. 6 is a fragmentary end view showing provision for circumferential location of the clutch plate of the FIG. 1 arrangement.
Figure 7:
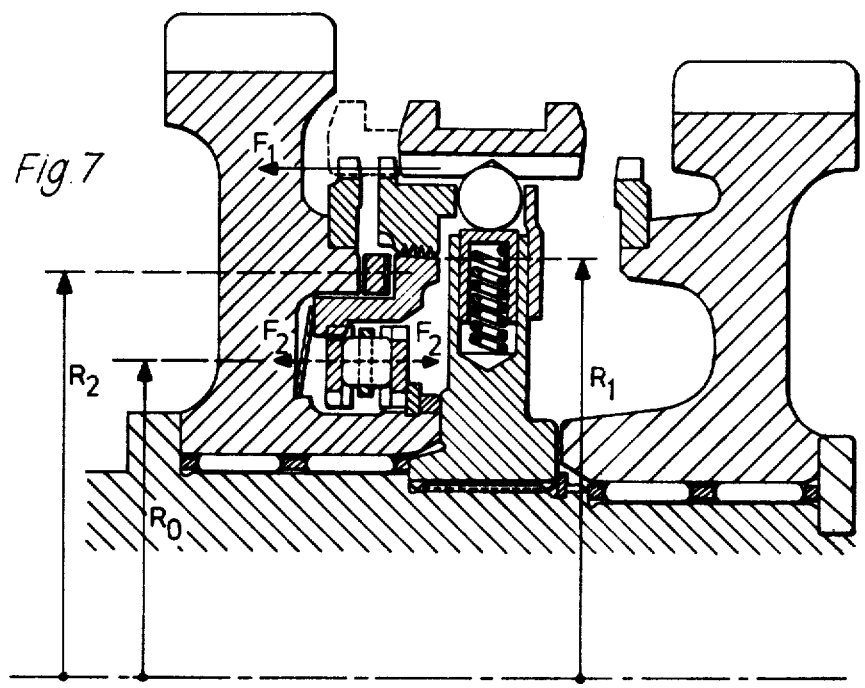
FIGS. 7 and 8 are views similar to FIGS. 1 and 5 respectively (but showing a ball type of detent), including notation corresponding to that used in a mathematical analysis herein.
Figure 8:
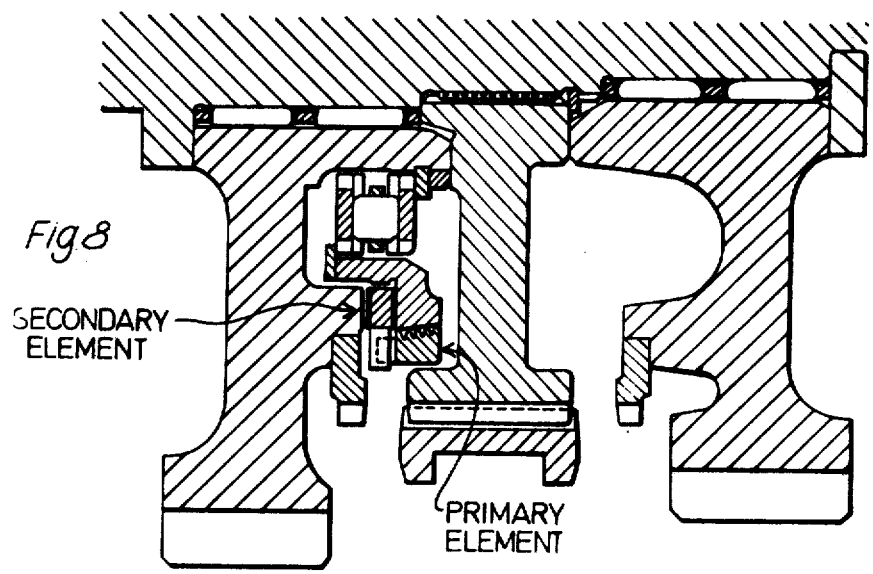

The clutch plate 21 is circumferentially located to the primary synchronizing element 3 by means of tags 22 (FIG. 6) on the clutch plate which are axially free to move in slots 23 of the primary synchronizing element.

In this way the clutch plate 21 acts as a secondary synchronizing element 3 to provide a supplementary drag torque. Thereby, due to the capability of the plate-type element to accept a high clamping force, it is possible to achieve a considerably greater synchronizing capacity than that of conventional cone-type elements of similar proportions.

The ramp angle of the clamping mechanism can readily be selected to provide the optimum clamping force on the secondary synchronizing element for a nominal axial load on the primary element, and it can be shown that a synchronizing torque capacity can be achieved which is in excess of three times that of a conventional cone-type synchronizer of similar proportions.

A further advantage of using plate-type elements as part of a synchronizer arrangement is that friction faces may be applied, as in the embodiment illustrated, to provide consistently high coefficient of friction with good transitional characteristics and durability, as is obtained on the shift clutches used in automatic transmissions which perform power-sustained shifts.

A release spring 24 acts on the intermediate element 16 to withdraw the clutch surfaces 19 and 20 as synchronization is approached, and so relieve the secondary clutch plate element 21 from partial loading when not selected for engagement.

The following is a mathematical analysis of the operation of the synchronizer arrangement which has been described:

HIGH CAPACITY SYNCHRONIZER MATHEMATICAL ANALYSIS

Let the cone angle of the primary element $= \alpha$

Let the cam face angle at the clamp plate 14 and gear member 15 $= \beta$

Let the frictional drag coefficient of the primary element $= \mu_1$

Let the frictional drag coefficient of the secondary element $= \mu_2$

Let the force applied to the primary element (Fork loading) $= F_1$

Let the clamping force on the secondary element $= F_2$

Let the effective radius of the primary element about axis of rotation $= R_1$

Let the effective radius of the secondary element about axis of rotation $= R_2$ Let effective radius of the cam faces about axis of rotation $= R_o$ Drag torque from primary element $= T_1 = R_1 \times F_1 \times 1/\text{SIN } \alpha \times \mu_1$ Drag torque from secondary element $= T_2 = R_2 \times (2 \times F_2 + F_1) \times \mu_2$ or $= R_2 \times 2 \times F_2 \times \mu_2$ if $F_1$ small with respect to $F_2$ Torque transmitted to the cam face $= T_3 = T_1 + T_2/2$ Clamp force from the cam faces $= F_2$ $$= \left[ T_1 + \frac{T_2}{2} \right] \times \frac{\text{Cot } \beta}{R_o}$$

and drag torque from secondary element $= T_2$ $$= R_2 \times 2 \times \left[ \frac{T_1 + T_2}{2} \right] \times \frac{\text{Cot } \beta}{R_o} \times \mu_2$$

Resolving for $T_2$ $$T_2 = R_2 \times 2 \times \left[ T_1 + \frac{T_2}{2} \right] \times \frac{\text{Cot } \beta}{R_o} \times \mu_2$$

$$1 = R_2 \times \left[ 2 \times \frac{T_1}{T_2} + 1 \right] \times \frac{\text{Cot } \beta}{R_o} \times \mu_2$$

$$\frac{R_o}{R_2 \times \text{Cot } \beta \times \mu_2} = 2 \times \frac{T_1}{T_2} + 1$$

$$T_2 = \frac{2 \times T_1}{\frac{R_o}{R_2 \times \text{Cot } \beta \times \mu_2} - 1}$$

Total synchronizing drag torque $= T_T$ $$= T_1 + T_2$$

$$= T_1 + \frac{2 \times T_1}{\frac{R_o}{R_2 \times \text{Cot } \beta \times \mu_2} - 1}$$

$$= T_1 \left[ 1 + \frac{2}{\frac{R_o}{R_2 \times \text{Cot } \beta \times \mu_2} - 1} \right]$$

$$= R_1 \times F_1 \times \frac{1}{\text{SIN } \alpha} \times \mu_1 \left[ 1 + \frac{2}{\frac{R_o}{R_2 \times \text{Cot } \beta \times \mu_2} - 1} \right]$$

Ratio of effectiveness of the high capacity synchronizer to a conventional cone type synchronizer of equivalent radius $R_1$.

$$= \frac{T_T}{T_1} = 1 + \frac{2}{\frac{R_o}{R_2 \times \text{Cot } \beta \times \mu_2} - 1}$$

Assuming $R_o/R_2 = 0.75$ and $\text{Cot } \beta \times \mu_2 = 0.50$ $$\frac{T_T}{T_1} = 1 + \frac{2}{\frac{.75}{.5} - 1} = \underline{5:1}$$

Condition at which system will lock-up. When $$\frac{R_o}{R_2 \times \text{Cot } \beta \times \mu_2} = 1$$

or less

The embodiments of the invention in which an exclusive property or privilege is claimed are defined as follows:

1. A synchronizer arrangement for bringing first and second rotary members of a stepped-ratio transmission into rotary synchronism, comprising a primary synchronizer element drivable by the first rotary member and provided with a friction surface, an intermediate element provided with a friction surface, means for effecting axial movement of the primary synchronizer element into frictional engagement with the intermediate element and thereby produce a synchronizing drag torque component at the intermediate element by co-operation of the said friction surfaces, a pair of co-operating ramp surfaces arranged to rotate with the intermediate element and the second rotary member respectively, means providing axial reaction for the ramp surface which rotates with the second rotary member, and a secondary synchronizer element that is connected to rotate with the second rotary member and is of higher torque-inducing capacity than the primary element, the secondary synchronizer element having a pair of opposed radially extending annular friction-clutch surfaces, and the synchronizing drag torque component at the intermediate element being effective, by the action of the pair of co-operating ramp surfaces, to produce axial movement of the intermediate element providing a clamping action at the pair of opposed radially extending annular friction-clutch surfaces of the secondary synchronizer element, to provide an additional synchronizing drag torque component which performs the major contribution in bringing the first and second rotary members of the stepped-ratio transmission into rotary synchronism.

2. A synchronizer arrangement for bringing first and second rotary members of a stepped-ratio transmission into rotary synchronism, comprising a primary synchronizer element drivable by the first rotary member, an intermediate element, friction surfaces on the primary synchronizer element and on the intermediate element respectively, means for effecting axial movement of the primary synchronizer element into frictional engagement with the intermediate element to thereby develop a synchronizing drag torque component at the intermediate element by co-operation of the respective friction surfaces, a pair of co-operating ramp surfaces responsive to the synchronizing drag torque component to produce axial movement of the intermediate element, and a secondary synchronizer element that has a pair of opposed radially extending annular friction-clutch surfaces and is of higher torque-inducing capacity than the primary element, the said axial movement of the intermediate element providing a clamping action at the said opposed radially extending annular friction-clutch surfaces to provide an additional synchronizing drag torque component which performs the major contribution in bringing the first and second rotary members of the stepped-ratio transmission into rotary synchronism.

3. A synchronizer arrangement for bringing first and second rotary members of a stepped-ratio transmission into rotary synchronism, comprising a synchro ring drivable by the first rotary member and provided with a frustoconical friction surface, an intermediate element provided with a frustoconical friction surface, means for effecting axial movement of the synchro ring into frictional engagement with the intermediate element and thereby produce a synchronizing drag torque component at the intermediate element by co-operation of the frustoconical surfaces, a pair of hardened steel ramp surfaces provided with friction-reducing rollers therebetween and arranged to rotate with the intermediate element and the second rotary member respectively, means providing axial reaction for the ramp surface which rotates with the second rotary member, and a plate-like secondary synchronizer element that has a pair of opposed radially extending annular friction-clutch surfaces with applied friction faces thereon and is connected to rotate with the second rotary member and is of higher torque-inducing capacity than the synchro ring, and the synchronizing drag torque component at the intermediate element being effective, by the action of the pair of co-operating ramp surfaces, to produce axial movement of the intermediate element providing a clamping action at the friction faces of the plate-like secondary synchronizer element, to provide an additional synchronizing drag torque component which performs the major contribution in bringing the first and second rotary members of the stepped-ratio transmission into rotary synchronism.

4. A synchronizer arrangement for bringing first and second rotary members of a stepped-ratio transmission into rotary synchronism, comprising a primary synchronizer element drivable by the first rotary member and in the form of a synchro ring provided with a frustoconical friction surface, an intermediate element provided with a frustoconical friction surface and constituting a primary synchronizing cone, means for effecting axial movement of the primary synchronizer element into frictional engagement with the intermediate element and thereby produce a synchronizing drag torque component at the intermediate element by co-operation of the frustoconical surfaces, a pair of cam plate members connected to rotate with the intermediate element and the second rotary member respectively, means on the second rotary member providing axial reaction for the cam plate member which rotates with the second rotary member, and a secondary synchronizer element that is connected to rotate with the second rotary member and is of higher torque-inducing capacity than the primary element, the secondary synchronizer element having a pair of opposed radially extending annular friction-clutch surfaces, and the synchronizing drag torque component at the intermediate element being effective, by the action of a pair of co-operating ramp surfaces provided on the respective cam plate members and having friction-reducing means therebetween, to produce axial movement of the intermediate element providing a clamping action at the pair of opposed radially extending annular friction-clutch surfaces of the secondary synchronizer element, to provide an additional synchronizing drag torque component which performs the major contribution in bringing the first and second rotary members of the stepped-ratio transmission into rotary synchronism.

5. A synchronizer arrangement for bringing first and second rotary members of a stepped-ratio transmission into rotary synchronism, comprising a primary synchronizer element drivable by the first rotary member and provided with a friction surface, an intermediate element provided with a friction surface, means for effecting axial movement of the primary synchronizer element into frictional engagement with the intermediate element and thereby produce a synchronizing drag torque component at the intermediate element by co-operation of the said friction surfaces, a plate-type secondary synchronizer element that is connected to rotate with the second rotary member and has a pair of opposed radially extending annular friction-clutch surfaces with applied friction faces thereon and is of higher torque-inducing capacity than the primary element, a pair of co-operating ramp surfaces that are arranged to rotate with the intermediate element and the second rotary member respectively and are disposed at a lesser radius than the friction faces of the plate-type secondary synchronizer element, at a location radially inwardly of the intermediate element, and means providing axial reaction for the ramp surface which rotates with the second rotary member, and the synchronizing drag torque component at the intermediate element being effective, by the action of the pair of co-operating ramp surfaces, to produce axial movement of the intermediate element providing a clamping action at the pair of opposed radially extending annular friction-clutch surfaces of the secondary synchronizer element, to provide an additional synchronizing drag torque component which performs the major contribution in bringing the first and second rotary members of the stepped-ratio transmission into rotary synchronism.

6. A synchronizer arrangement for bringing a gearbox mainshaft and a constant-mesh gear that is rotatably mounted thereon into rotary synchronism, comprising a synchro ring connected to be driven by the gearbox mainshaft and provided with a frustoconical friction surface, a sliding-sleeve clutch member connected to rotate with the gearbox mainshaft and axially movable to apply axial loading to the synchro ring, external-engagement dog teeth formed on the constant-mesh gear for engagement by internal clutch teeth formed on the sliding-sleeve clutch member, an intermediate element provided with a frustoconical friction surface, means for effecting axial movement of the synchro ring into frictional engagement with the intermediate element and thereby produce a synchronizing drag torque component at the intermediate element by co-operation of the frustoconical surfaces, a pair of co-operating ramp surfaces arranged to rotate with the intermediate element and the constant-mesh gear respectively, means providing axial reaction for the ramp surface which rotates with the constant-mesh gear, and a secondary synchronizer element that is connected to rotate with the constant-mesh gear and is of higher torque-inducing capacity than the synchro ring, the secondary synchronizer element having a pair of opposed radially extending annular friction-clutch surfaces, and the synchronizing drag torque component at the intermediate element being effective, by the action of the pair of co-operating ramp surfaces, to produce axial movement of the intermediate element providing a clamping action at the pair of opposed radially extending annular friction-clutch surfaces of the secondary synchronizer element, to provide an additional synchronizing drag torque component which performs the major contribution in bringing the gearbox mainshaft and the constant-mesh gear into rotary synchronism.

7. A synchronizer arrangement according to claim 6, in which the synchro cone includes a ring of baulking teeth formed with baulk chamfers that are engageable by baulk chamfers formed on the internal clutch teeth, for transfer of axial load direct from the sliding-sleeve clutch member to the synchro cone, and prevention of dog-tooth engagement between the sliding-sleeve clutch member and the constant-mesh gear, until the gearbox mainshaft and the constant-mesh gear approach rotary synchronism.

8. A synchronizer arrangement for bringing a gearbox mainshaft and a constant-mesh gear that is rotatably mounted on the mainshaft into rotary synchronism, comprising a synchro ring drivable by the gearbox mainshaft and provided with a frustoconical friction surface, a sliding-sleeve clutch member connected to rotate with the gearbox mainshaft and axially movable to apply axial loading to the synchro ring, external-engagement dog teeth formed on the constant-mesh gear for engagement by internal clutch teeth formed on the sliding-sleeve clutch member, an intermediate element provided with a frustoconical friction surface, means for effecting axial movement of the synchro ring into frictional engagement with the intermediate element and thereby produce a synchronizing drag torque component at the intermediate element by co-operation of the frustoconical surfaces, a pair of co-operating ramp surfaces arranged to rotate with the intermediate element and the constant-mesh gear respectively, means on the constant-mesh gear providing axial reaction for the ramp surface which rotates with the constant-mesh gear, and a secondary synchronizer element that is connected to rotate with the constant-mesh gear and is of higher torque-inducing capacity than the synchro ring, the secondary synchronizer element having a pair of opposed radially extending annular friction-clutch surfaces disposed axially between a clutch surface of the intermediate element and a clutch surface of the constant-mesh gear, and the synchronizing drag torque component at the intermediate element being effective, by the action of the pair of co-operating ramp surfaces, to produce axial movement of the intermediate element in a direction towards the constant-mesh gear such that the annular friction-clutch surfaces of the secondary synchronizer element are thereby clamped between the clutch surfaces of the intermediate element and constant-mesh gear respectively, to provide an additional synchronizing drag torque component which performs the major contribution in bringing the gearbox mainshaft and the constant-mesh gear into rotary synchronism.

* * * * *